(12) United States Patent
Ruhl et al.

(10) Patent No.: US 12,420,333 B2
(45) Date of Patent: Sep. 23, 2025

(54) METHOD FOR PRODUCING A CYLINDRICAL HOLLOW BODY MADE OF ALUMINUM OR OF AN ALUMINUM ALLOY OR OF A LIGHT METAL ALLOY, CYLINDRICAL HOLLOW BODY, AND VEHICLE TRANSMISSION

(71) Applicant: ZF Friedrichshafen AG, Friedrichshafen (DE)

(72) Inventors: Christian Ruhl, Friedrichshafen (DE); Helmut Boehm, St. Ingbert (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 288 days.

(21) Appl. No.: 17/794,682

(22) PCT Filed: Jan. 21, 2021

(86) PCT No.: PCT/EP2021/051274
§ 371 (c)(1),
(2) Date: Jul. 22, 2022

(87) PCT Pub. No.: WO2021/148506
PCT Pub. Date: Jul. 29, 2021

(65) Prior Publication Data
US 2023/0100588 A1  Mar. 30, 2023

(30) Foreign Application Priority Data
Jan. 23, 2020 (DE) .................. 10 2020 200 766.7

(51) Int. Cl.
*B22D 15/00* (2006.01)
*B22D 17/00* (2006.01)
*B22D 21/00* (2006.01)

(52) U.S. Cl.
CPC ................. *B22D 15/005* (2013.01)

(58) Field of Classification Search
CPC ...... B22D 15/00; B22D 15/005; B22D 17/00; B22D 21/00; B22D 21/002; B22D 21/007
(Continued)

(56) References Cited

U.S. PATENT DOCUMENTS 10,539,216 B2   1/2020   Shirakawa
2002/0079710 A1   6/2002   Wieser et al.
(Continued)

FOREIGN PATENT DOCUMENTS

DE   4237024 A1   5/1994
DE   10064590 A1   6/2002
(Continued)

OTHER PUBLICATIONS

International Search Report (English Translation) PCT/EP2021/051274, dated Apr. 17, 2021. (2 pages).
(Continued)

*Primary Examiner* — Kevin P Kerns
(74) *Attorney, Agent, or Firm* — Dority & Manning, P.A.

(57) ABSTRACT

A method for producing a cylindrical hollow body (20) made of aluminum, an aluminum alloy, or a light metal alloy, includes casting a hollow body (20) such that the hollow body (20) has an inner and an outer lateral surface (21, 22) and two axial end faces. The method also includes, during the casting process, making at least one defined notch (35, 35') into one or more of the inner lateral surface (21), the outer lateral surface (22), and the two axial end faces.

10 Claims, 1 Drawing Sheet

(58) Field of Classification Search
USPC .......................................... 164/47, 76.1, 113
See application file for complete search history.

(56) References Cited

U.S. PATENT DOCUMENTS

| | | |
|---|---|---|
| 2013/0160964 A1 | 6/2013 | Hahn et al. |
| 2016/0243612 A1 | 8/2016 | Weizenbeck et al. |
| 2022/0241908 A1 | 8/2022 | Ruhl et al. |

FOREIGN PATENT DOCUMENTS

| | | |
|---|---|---|
| DE | 102011056942 B3 | 5/2013 |
| DE | 102015203033 A1 | 8/2016 |
| DE | 102017006417 A1 | 2/2018 |
| DE | 102016219306 A1 | 4/2018 |
| WO | WO 2020/234306 A1 | 11/2020 |

OTHER PUBLICATIONS

German Search Report DE 10 2020 200 766.7, dated Jul. 30, 2020. (10 pages).

METHOD FOR PRODUCING A CYLINDRICAL HOLLOW BODY MADE OF ALUMINUM OR OF AN ALUMINUM ALLOY OR OF A LIGHT METAL ALLOY, CYLINDRICAL HOLLOW BODY, AND VEHICLE TRANSMISSION

CROSS-REFERENCE TO RELATED APPLICATIONS

The present application is related and claims priority to 102020200766.7 filed in the German Patent Office on Jan. 23, 2020 and is a U.S. national phase of PCT/EP2021/051274 filed in the European Patent Office on Jan. 21, 2021, both of which are incorporated by reference in their entirety for all purposes.

FIELD OF THE INVENTION

The present invention relates generally to a method for producing a cylindrical hollow body made of aluminum or of an aluminum alloy or of a light metal alloy, to a corresponding cylindrical hollow body, and to a corresponding vehicle transmission.

BACKGROUND

In the motor vehicle manufacturing sector, the increasing use of components made of lightweight materials for reasons of reducing the weight of vehicles and, consequently, of saving fuel and of reducing carbon dioxide ($CO_2$) emissions is familiar. Since such components here replace conventional components, for example components made of steel, such components must meet the same requirements with respect to mechanical load-bearing capacity, to corrosion resistance, and, ideally, also with respect to machinability and production costs. In this context, it is, in particular, different aluminum alloys, whose properties can be selectively adjusted within a certain range by the different alloy constituents, which have proven to be well suited. The components produced from the different aluminum alloys are usually produced as castings, with high demands being placed on the geometric characteristics of the components, i.e. in particular on geometric precision of the components. As a rule, finish-machining of the components cast from aluminum or an aluminum alloy is therefore necessary, for example the making of what are referred to as balancing holes, in order to reduce or as completely as possible remove an imbalance in the components.

In this connection, DE 10 2011 056 942 B3 discloses a method for producing a thin-walled and cylindrical component made of aluminum or of an aluminum alloy. In this case, the component is first produced by diecasting, a nose being integrally cast on the upper or on the lower circumference of the component. After casting, a code is applied to the component, the position of which is clearly defined with reference to the nose. In a further process step, the component is mounted on a workpiece carrier. Here, the rotational orientation of the component plays a major role. The nose and the code are used to position and clearly define the machining position of the component. The component is then clamped centrally in the unfinished state, and the inner surface as well as the outer surface are skimmed by cutting. Only those partial regions on which the nose is arranged and on which the component is clamped are excluded from skimming.

However, the production method known from DE 10 2011 056 942 B3 is disadvantageous in that that partial region of the surface of the component on which the nose is arranged cannot be machined without losing the information about the prescribed machining position. Thus, the possibilities of process monitoring and error analysis for a successful, corrective process intervention are limited. This is because a component which has lost the information about original positioning during the diecasting process is unsuitable for certain corrective process interventions.

SUMMARY OF THE INVENTION

Example aspects of the invention provide an improved method for producing a cylindrical hollow body made of aluminum or of an aluminum alloy or of a light metal alloy.

Example aspects of the invention provides a method for producing a cylindrical hollow body made of aluminum or of an aluminum alloy or of a light metal alloy. The hollow body is produced by a casting process in such a way that the hollow body has an inner and an outer lateral surface and two axial end faces. The method according to example aspects of the invention is distinguished by the fact that, during the casting process, at least one defined notch is molded into the inner and/or into the outer lateral surface and or into at least one axial end face.

Thus, according to example aspects of the invention, it is envisaged that first of all a cylindrical hollow body is cast by a known casting process either from aluminum or from an aluminum alloy or from a light metal alloy. According to example aspects of the invention, it is not necessary to fix on a specific casting process as long as the casting process is suitable in principle for casting hollow bodies made of aluminum or of an aluminum alloy or of a light metal alloy. Preferred light metal alloys are, in particular, light metal alloys based on magnesium. Since this is a cylindrical hollow body, the hollow body has a round cross section and an inner and an outer lateral surface. The cylindrical hollow body is preferably of tubular design, that is to say preferably has two open axial ends, via which for example, machining of the inner lateral surface is possible and indeed simple. In the case of a tubular design of the hollow body, the two axial end faces are of correspondingly annular design.

Since, during the casting process, at least one defined notch is molded into the inner and or into the outer lateral surface and or into the at least one axial end face, there is the advantage over the prior art that, in the form of the at least one notch, it is possible to provide information about a rotational orientation of the hollow body which—in contrast to a molded-on nose—is not removed by finish-machining. Thus, in the case of a hollow body produced according to example aspects of the invention, it is possible to machine even the region which has the notch, without the information about the rotational orientation being lost in the process.

The at least one notch is preferably at least one millimeter (1 mm) deep, particularly preferably at least two millimeter (2 mm) deep and very particularly preferably at least three millimeter (3 mm) deep. This ensures, on the one hand, that the at least one notch is easily recognizable, in particular is also recognizable in an automated manner, for example by a camera. On the other hand, it is ensured that the at least one notch can still be perceived as a notch even after machining of the surface surrounding the notch.

Furthermore, it is preferred that the at least one notch has a defined shape, for example has a square or star-shaped cross section, thus enabling the notch to be reliably distinguished from accidental notch-like damage or production defects.

The preservation of the information about the rotational orientation is relevant insofar as, after production of the hollow body, the hollow body is as a rule subjected to a large number of processing steps, for example balancing for the determination of imbalances and for the elimination of imbalances, wherein the determination of the imbalances takes place on a first system and the elimination of the imbalances takes place on a second system. In order to eliminate the imbalances, it is in turn necessary to know the exact position of the imbalances or to know the position of the imbalances relative to a clearly identifiable feature of the hollow body, such as the notch according to example aspects of the invention.

Thus, by the method according to example aspects of the invention, it is possible, for example, also to remove an imbalance which otherwise could not be eliminated without also losing the information about the rotational orientation. Accordingly, a hollow body which, according to the prior art, would have to be segregated out as a reject can still be used for process analysis and for corrective process intervention measures by virtue of the method according to example aspects of the invention. Example aspects of the invention thus lead to an early-stage reduction in rejects and thus also in production costs. Furthermore, Example aspects of the invention lead to a reduction in process run times, particularly during any balancing process that may follow production, since an original imbalance can already be reduced during production.

According to a preferred example embodiment of the invention, it is envisaged that the casting process is carried out as a diecasting process. In this case, the aluminum or the aluminum alloy is preferably first introduced in liquid form into a corresponding filling chamber of a casting device, the filling chamber being filled under pressure by applying pressure to the aluminum or the aluminum alloy or the light metal alloy by a casting piston. The pressurization is advantageously maintained until the aluminum or the aluminum alloy or the light metal alloy has solidified. It is thereby possible to produce comparatively precise geometric shapes with only a low reject rate.

In order to simplify processing of the hollow body following production, provision is preferably made to clamp the final cast hollow body centrally. For this purpose, the prior art contains clamping devices which enable a cylindrical hollow body made of aluminum or of an aluminum alloy to be clamped centrally. The subsequent processing can include different forms and dimensions, it being conceivable, for example, that the hollow body is only polished. However, comparatively complex processing, for example machining, is also conceivable.

According to a further preferred example embodiment of the invention, it is envisaged that the inner and/or the outer lateral surface of the hollow body are/is at least partially skimmed. This results in the advantage that the geometry of the cast hollow body is finish-machined as far as necessary, thus enabling extremely precise shaping to be achieved. Here, the geometric precision that can be achieved by machining is generally higher than the geometric precision that can be achieved by a casting process. Since the hollow body is preferably intended for use in a vehicle transmission and there, in particular, for transmitting torques or rotational speeds, good concentricity properties and thus high geometric precision are important prerequisites. A certain partial region can also remain unskimmed or unmachined, for example because the hollow body was clamped on this partial region and this partial region was thus not accessible to a turning tool. However, it is also possible to subsequently re-clamp onto another partial region of the surface of the hollow body and, associated with this, also to skim the partial region which has hitherto remained unmachined.

According to a further preferred example embodiment of the invention, provision is made for the hollow body to be produced in such a way that the hollow body has internal toothing in at least one partial region of the inner lateral surface. Via the internal toothing, the hollow body can be connected, e.g. for conjoint rotation, to other elements, for instance a toothed disk of a vehicle transmission.

According to a particularly preferred example embodiment of the invention, provision is made for the hollow body to be produced in such a way that the hollow body has internal toothing in each of two partial regions of the inner lateral surface. This results in the advantage that the hollow body can advantageously be used for transmitting torques in the vehicle transmission. Here, a first internal toothing serves as an input for the torque to be transmitted, while a second internal toothing serves as an output for the torque to be transmitted.

According to a further preferred example embodiment of the invention, provision is made for the hollow body to be balanced. The balancing in the sense according to example aspects of the invention here equally includes the determination of imbalances and their elimination. The elimination of the imbalances does not necessarily have to be complete, but must at least go so far that a predetermined maximum permissible imbalance is no longer exceeded. By the balancing, very good concentricity properties of the hollow body can be achieved, which in turn contributes to lower noise emissions and a longer service life of the vehicle transmission in which the hollow body is arranged. In this context, balancing is preferably carried out by machining, with material being removed selectively at those points of the hollow body which lead to the respectively determined imbalance. The material removal is in turn preferably accomplished by drilling openings of correspondingly larger or smaller dimensions in certain partial regions of the hollow body, wherein a diameter of the respectively provided drilled opening can be dependent on a severity of the determined imbalance. These drilled openings accordingly serve as balancing holes. The imbalances are preferably determined by a device known per se for determining the imbalances which is suitable for this purpose.

According to a further preferred example embodiment of the invention, provision is made for the hollow body to be deburred and/or brushed and/or washed during the processing of the hollow body. In this context, the hollow body can be brushed or washed both before balancing and after balancing. Deburring, in contrast, preferably takes place exclusively after balancing since it is thus advantageously possible to remove all burrs, including those which have arisen due to any balancing holes provided. This makes it possible to ensure that any material particles or burrs which may be present do not enter the vehicle transmission and adversely affect the efficiency or functioning of the vehicle transmission.

Example aspects of the invention further relate to a cylindrical hollow body made of aluminum or of an aluminum alloy. The hollow body according to example aspects of the invention is distinguished by the fact that the hollow body is produced by the method according to example aspects of the invention. As a result, the advantages already mentioned in connection with the method according to example aspects of the invention are also obtained for the hollow body according to example aspects of the invention.

Finally, example aspects of the invention also relate to a vehicle transmission. The vehicle transmission according to example aspects of the invention is distinguished by the fact that the vehicle transmission includes at least one cylindrical hollow body according to example aspects of the invention. This leads to the advantages already described.

The arrangement of the hollow body in the vehicle transmission is preferably effected exclusively by way of the tooth flanks of the internal toothing, which lie flat against correspondingly designed flanks of mating toothing in the vehicle transmission. Torques are accordingly transmitted via the flanks of the internal toothing and the flanks of the mating toothing. The hollow body can, for example, assume the function of a hollow shaft in the vehicle transmission.

BRIEF DESCRIPTION OF THE DRAWINGS

Example aspects of invention are explained by way of example below with reference to exemplary embodiments illustrated in the figures.

More specifically.

DETAILED DESCRIPTION

Figure 1:
FIG. 1 shows, by way of example, one possible embodiment of a method according to example aspects of the invention for producing a cylindrical hollow body made of aluminum or of an aluminum alloy in the form of a flow diagram.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Identical objects, functional units and comparable components are denoted by the same reference signs throughout the figures. These objects, functional units and comparable components are of identical design in respect of their technical features, unless explicitly or implicitly implied otherwise by the description.

FIG. 1 shows, by way of example, one possible embodiment of a method according to example aspects of the invention for producing a cylindrical hollow body 20 made of aluminum or of an aluminum alloy in the form of a flow diagram. In method step 1, the hollow body 20 is first of all produced by a casting process, in the example by a diecasting process. In this case, production takes place in accordance with a casting tool used or in accordance with a filling chamber of the casting tool in such a way that the hollow body 20 has an inner and an outer lateral surface 21, 22, and furthermore, in the example, has internal toothing 24 and 24' respectively in two partial regions 23 and 23' of the inner lateral surface 21, and that a defined notch 35 is molded into the inner lateral surface 21 during the casting process. In the example, the notch 35 is located on the outer circumference in an axial end region of the hollow body 20. Here, the notch 35 serves to define a rotational position of the hollow body 20 in the subsequent machining steps. For subsequent and further processing of the hollow body 20 after the diecasting process, the hollow body 20 is then clamped centrally in step 2. In the example, central clamping takes place on tip circle diameters of the internal toothing 24 and 24'. In method step 3, both the inner lateral surface 21 and the outer lateral surface 22 are skimmed as part of the processing of the hollow body 20. Since the notch 35 is molded into the hollow body, that is to say, in contrast to the cast noses which are usually used and which are fitted on, it is not raised above the surface of the hollow body, it cannot be removed by the skimming process either. Thus, the partial region on which the notch 35 is arranged can therefore be unhesitatingly skimmed without the information about a rotational orientation of the hollow body 20 being lost in the process. However, in the example, the partial regions 23 and 23', which have the internal toothing 24 and 24', remain unskimmed or unmachined since in this case the hollow body 20 is in each case clamped in the region of the tip circle diameter. In the example, the skimming of the inner and outer lateral surfaces 21, 22 is performed by a turning device designed for this purpose. In the following method step 4, the hollow body 20 is re-clamped on the tip circle diameter of the internal toothing 24 and 24' in each case, and balanced. As part of the balancing process, the imbalances of the hollow body 20 are first of all determined, this being accomplished by a device for determining imbalances, which is designed for this purpose. If an impermissible imbalance is detected, excess material on the hollow body 20, which causes the eccentricity, is removed as part of the balancing process. In the example, the removal of the excess material is accomplished by making balancing holes 34 through the inner and outer lateral surfaces 21, 22. In a subsequent method step 5, the hollow body 20 is deburred, brushed and washed in order to remove any burrs and contaminants that may be present.

Figure 2B:
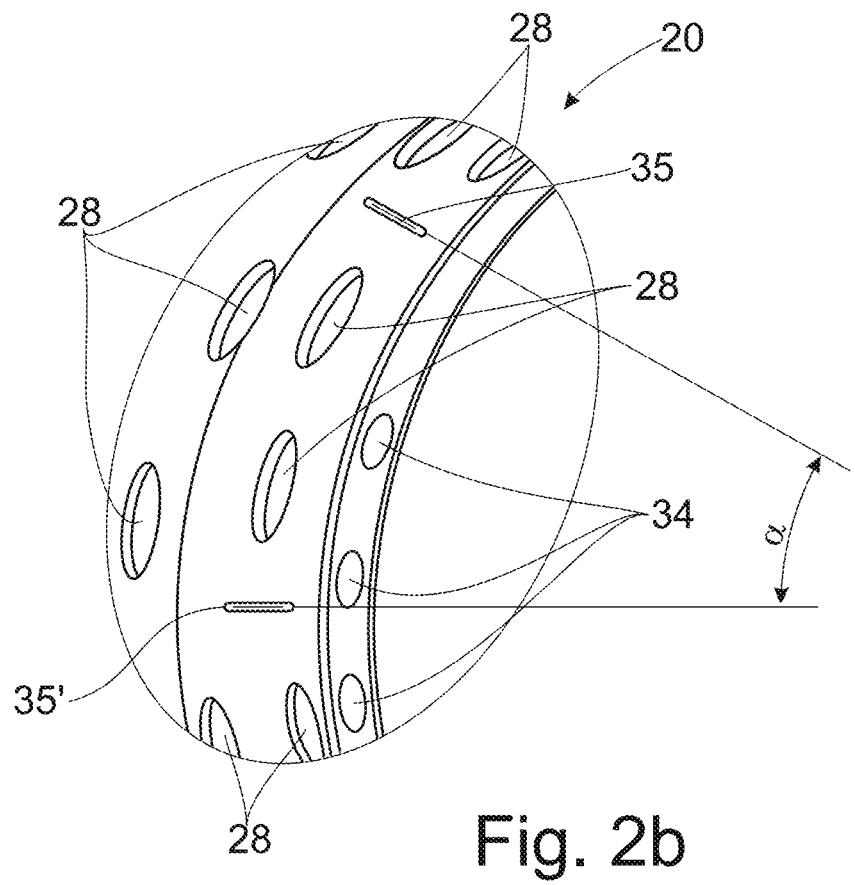
FIGS. 2a and b show, by way of example, one possible embodiment of a cylindrical hollow body according to example aspects of the invention.
Figure 2A:
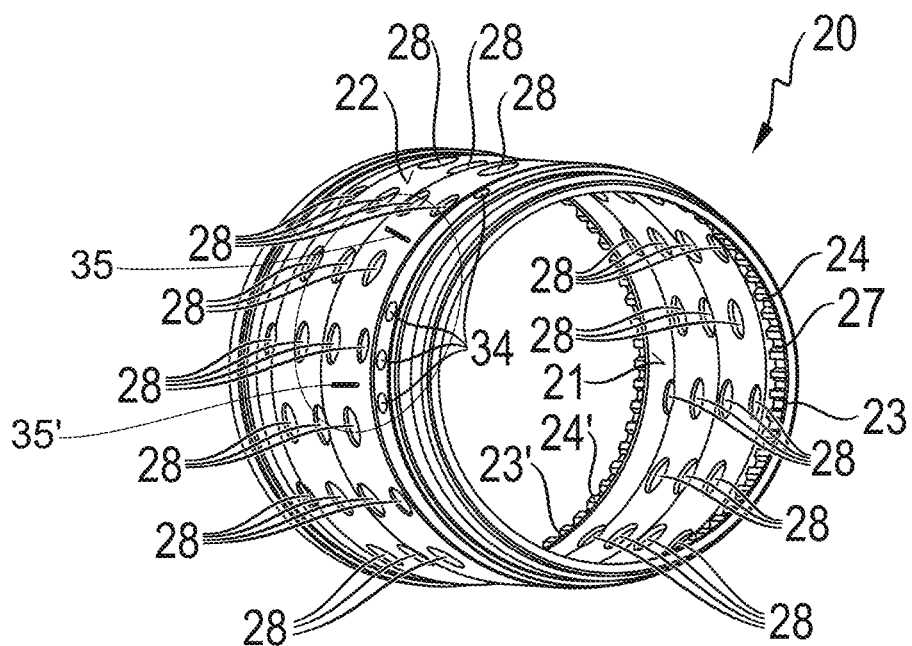

FIG. 2a shows, by way of example, one possible embodiment of a cylindrical hollow body 20 according to example aspects of the invention. The hollow body 20 illustrated consists of an aluminum alloy, in the example of AlSi9Cu3 (Fe), and was produced by a diecasting process. The cylindrical hollow body 20 has an inner lateral surface 21 and an outer lateral surface 22. Two defined notches 35, 35' are arranged on the outer lateral surface 22 and have an angle α of 35° along the circumference of the hollow body 20. The two notches 35, 35' were molded into the outer lateral surface 22 during the casting process. Both the inner lateral surface 21 and the outer lateral surface 22 with the notches 35, 35' were skimmed as part of a processing operation carried out on the hollow body 20. Only a first partial region 23 and a second partial region 23', which also each have internal toothing 24, 24', have remained unskimmed or unmachined, that is to say are still in the unfinished state. In this case, the internal toothing 24, 24' has already been produced during the casting process. It can furthermore be seen that the hollow body 20 has a multiplicity of holes 28. In this case, the holes 28 have different diameters and serve, on the one hand, to reduce the weight of the hollow body 20 and also to drain oil out of the hollow body 20 when the hollow body 20 is later used in a vehicle transmission. In addition, balancing holes 34 can be seen, the balancing holes 34 being arranged predominantly as close as possible to each partial region 23, 23' or to each internal toothing 24, 24' of the hollow body 20. The balancing holes 34 can have different diameters, depending on the material removal required, and serve to improve the properties, in particular the acoustic properties, and concentricity properties of the hollow body 20 in the vehicle transmission. In addition, however, the balancing holes 34 also contribute to further weight reduction of the hollow body 20 and to further improved oil drainage out of the hollow body 20.

FIG. 2b shows an enlarged detail of the outer lateral surface 22 of the hollow body 20 of FIG. 2a. FIG. 2b shows the two notches 35 and 35', which can still be seen despite the previously effected skimming of the outer lateral surface 22, including in the region of the notches 35 and 35', and which can be used above all to determine the rotational orientation of the hollow body 20. In the example, the notches 35 and 35' have an angle α of 35° along the circumference of the hollow body 20.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS 1 production of the hollow body
2 central clamping
3 skimming of the inner and outer lateral surface
4 balancing
5 deburring, brushing and washing
20 hollow body
21 inner lateral surface
22 outer lateral surface
23, 23' partial region with internal toothing
24, 24' internal toothing
27 tooth flanks of the internal toothing
28 hole
34 balancing hole
35, 35' notch
α angle

The invention claimed is:

1. A method for producing a cylindrical hollow transmission shaft (20) of aluminum, an aluminum alloy, or a light metal alloy, the method comprising:
casting the hollow transmission shaft (20) such that the hollow transmission shaft (20) has an inner lateral surface (21), an outer lateral surface (22), and two axial end faces and such that at least one defined notch (35, 35') is molded into one or more of the inner lateral surface (21), the outer lateral surface (22), and the two axial end faces; and
after the casting, at least partially skimming (3) the one or more of the inner lateral surface (21), the outer lateral surface (22), and the two axial end faces at the at least one defined notch (35, 35'),
wherein the at least one defined notch (35, 35') remains on the one or more of the inner lateral surface (21), the outer lateral surface (22), and the two axial end faces after the at least partially skimming (3).

2. The method of claim 1, wherein the casting is a diecasting process (1).

3. The method of claim 1, wherein the least partially skimming (3) comprises at least partially skimming (3) one or both of the inner lateral surface (21) and the outer lateral surface (22) of the hollow transmission shaft (20).

4. The method of claim 1, wherein casting the hollow transmission shaft (20) comprises casting the hollow transmission shaft (20) such that the hollow transmission shaft (20) has internal toothing (24) in at least one portion (23, 23') of the inner lateral surface (21).

5. The method of claim 4, wherein casting the hollow transmission shaft (20) comprises casting the hollow transmission shaft (20) such that the hollow transmission shaft (20) has the internal toothing (24) in each of two portions (23, 23') of the inner lateral surface (21).

6. The method of claim 1, further comprising balancing the hollow transmission shaft (20).

7. The method of claim 1, further comprising one or more of:
deburring the hollow transmission shaft (20);
brushing the hollow transmission shaft (20); and
washing the hollow transmission shaft (20).

8. The method of claim 1, wherein a depth of the at least one defined notch (35, 35') is no less than two millimeters.

9. The method of claim 1, wherein the hollow transmission shaft (20) is installable within a vehicle transmission (29) to transmit torque.

10. The method of claim 9, wherein:
casting the hollow body (20) comprises casting the hollow body (20) such that the hollow body (20) has internal toothing (24) in at least one portion (23, 23') of the inner lateral surface (21); and
the internal toothing (24) is configured to mesh with a toothed disk in the vehicle transmission (29).

* * * * *